W. C. DODGE.
Calf Feeder.
No. 43,902. Patented Aug. 23, 1864.
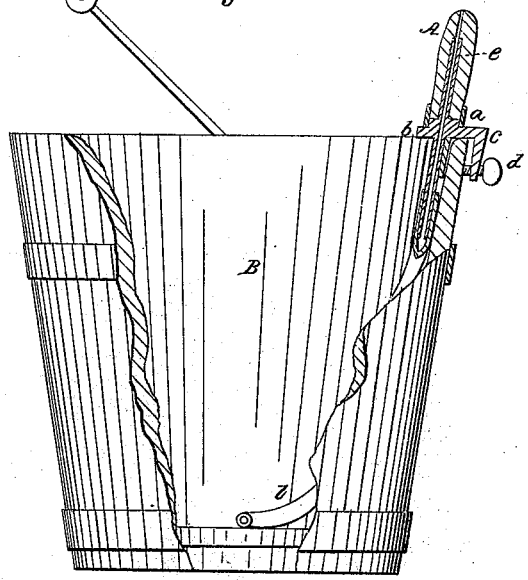
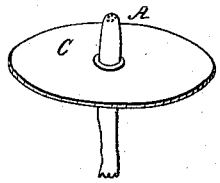
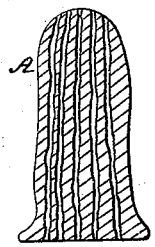
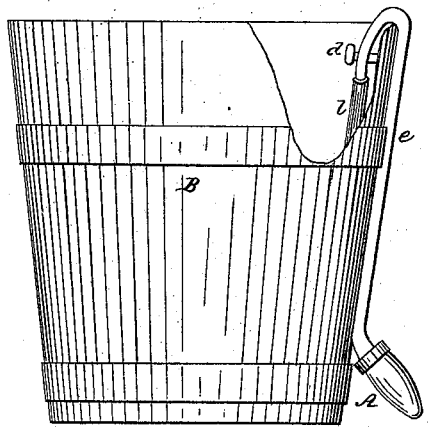
Witnesses:
Inventor:
William C. Dodge

UNITED STATES PATENT OFFICE.

WILLIAM C. DODGE, OF WASHINGTON, DISTRICT OF COLUMBIA.

CALF-FEEDER.

Specification forming part of Letters Patent No. 43,902, dated August 23, 1864.

*To all whom it may concern:*

Be it known that I, WILLIAM C. DODGE, of Washington city, in the District of Columbia, have invented a new and useful Method and Means of Feeding Calves and Other Young Animals; and I do hereby declare that the following is a clear, full, and exact description thereof, reference being had to the accompanying drawings, and to the letters of reference marked thereon, making part of this specification.

The nature of my invention consists in an artificial teat of novel construction, provided with suitable tubes for the purpose of enabling the calf or other animal to draw its milk or other liquid food from a pail or other vessel by the natural process of sucking, whereby the trouble and delay of teaching it to drink is dispensed with.

It further consists in providing said teat with the means of being easily and readily attached to or detached from a pail, trough, or other vessel containing the food.

To enable others skilled in the art to make and use my invention, I will proceed to describe it.

Figure 1 represents a pail with the feeding apparatus attached ready for use, a portion of the pail being shown broken away for the purpose of showing the device in position, the latter being shown in section. Fig. 2 represents the same attached to the pail in a different position. Fig. 3 represents the teat in section, constructed in a modified form. Fig. 4 is a top plan view of the teat with its metal socket, showing one method of securing it to the attaching device. Fig. 5 represents the teat secured to a floating disk or device.

Similar letters in each of the figures refer to corresponding parts.

A in each of the figures represents an artificial teat, made of any suitable substance, but preferably of india-rubber, which will be constructed of suitable size and form, according as it is to be used to feed calves, lambs, or other animals. This teat A is secured to a metal socket, $b$, by means of the annular flange or ring $a$, which may be secured to $b$ by a screw-thread, as shown in Fig. 1, or by means of the lugs $i$, inserted through the recesses $h$ and turned so as to engage upon the flange $a$, as shown in Fig. 4. The socket $b$ is provided with an arm, $c$, in which a screw, $d$, works, whereby the whole may be readily attached to the top of a pail or other vessel, as clearly shown in Fig. 1. The socket $b$ has a small tube, $e$, projecting from it both above and below, the portion above entering some distance into the rubber teat for the purpose of preventing the animal from stopping the flow of the liquid by biting or squeezing the teat, as it otherwise would sometimes do. That portion of the tube below the socket may be made to extend to the bottom of the vessel, whereby its lower open end will be always immersed in the milk so long as any remains in the vessel. It is preferred, however, to make this portion of the tube shorter and to attach thereto a small flexible tube, $b$, of rubber or other suitable substance, by which means the feeding device may be adapted to pails, troughs, or other vessels of various sizes and forms, while the teat itself remains attached to the edge or top of the same.

It is obvious that a cam or eccentric headed lever may be substituted for the set-screw $d$, and made to produce the same result.

In Fig. 2 the teat is shown attached to the pail or vessel B in a different position, which may sometimes be an object, with very young animals, as this latter position accords more fully with that of the natural teat in animals of the class referred to, and will therefore be more readily seized and used by the young calf, which instinctively, and sometimes very obstinately, elevates its nose when seeking for its food. In such case the vessel containing the food may be placed upon a barrel, box, or bench, so as to bring it to the required height to adapt it to the condition and size of the animal; or, if a trough be used, it may be secured permanently in place. When this method of attaching the teat is adopted the metal tube $e$ should be made heavier and stronger than in the former case, and may be secured to the pail or vessel, near the teat, by a strap or other suitable means. Instead of having the tube $e$ bent and passing over the top of the vessel, as shown in Fig. 2, it may be made to end near the top, on the outside, and be secured by an arm attached thereto and projecting over on the inside, like that in Fig. 1, reversed. In that case the rubber tube $b$ would pass over the edge of the vessel and unite with the metal tube on the outside. It is obvious that the tube may be made to enter a hole in the side of the vessel nearly on a level with the milk and produce the same result; but it is immaterial how the feeding device is attached to the vessel, provided the teat be brought into a proper position to be readily presented to the animal, and the opposite end of the tube be immersed in the milk or other fluid.

Fig. 5 represents the teat A secured to a disk of wood or substance that will float on the liquid. The float may be made of any shape or material that will float. If to be used in a pail, a circular piece of board, like that shown in Fig. 3, will answer the purpose.

Fig. 3 represents the teat constructed with a series of small tubular passages running through it longitudinally for the purpose of avoiding the necessity of using a metal tube in it. When it is thus constructed, it will be seen that though the calf may, by compressing the teat, close some of the tubes, yet some of them will remain open, thus permitting the flow of the milk or other liquid.

Instead of the tube e being made of metal where it projects into the teat, it is obvious that a tube of hard rubber may be substituted in its stead; or the inner or central core of the teat may be made of harder rubber to prevent it from collapsing, while the outer portion may be of softer rubber to make it more nearly resemble the natural teat and prevent injuring the teeth or mouth of the animal.

By means of my invention calves can be fed at once without the trouble and time required by the present method of teaching them to drink, when they are raised by hand; and in those portions of the country where no method of rearing them is known or in practice, except that of permitting them to run with the cow, as is the case in many parts of the South especially, and of the West, also, the use of my invention will enable them to be raised without being allowed to run with the cow, by which means the use of the cow for making butter and cheese may be secured when it otherwise would not be, the calf in such cases being fed on skim milk, corn, or oatmeal porridge, the latter of which is known to be exceedingly well adapted for that purpose. This, in view of the present and prospective high price of butter and cheese, becomes a matter of great importance.

Again, it is well known that the demands of the army and the great destruction of cattle have largely enhanced their value, and that at the same time while their value is constantly increasing their numbers are decreasing, rendering it of the utmost importance that every calf that can be should be raised. Notwithstanding this urgent demand for the rearing of stock in some sections, where no method of rearing calves is known but that of letting them run with the cow, the high price and ready sale of butter and cheese makes it more profitable for the owners to use their cows for the production of these latter articles than to raise the calves by giving them the use of the cow during four or five of the best months of the season, and hence they kill the calves or give them away to get rid of them. By the use of my invention the calves can be raised, and the use of the cow for making butter and cheese be had at the same time, thus adding largely to individual and national wealth and resources. Even where these objects are now attained by teaching calves to drink by hand, there will be a great saving of time and trouble by the adoption of my invention. As is well known, calves are to be fed in the spring of the year, at a time when the farmer is hurried, preparing for and getting in his spring crops, and at the most rainy and disagreeable season, when yards and pens are muddy and filthy, thus rendering the labor of teaching the calves to drink, and of feeding them thereafter, one of the most disagreeable and troublesome duties pertaining to the operations of the farmer and stock-grower.

It is also sometimes very difficult to teach calves to drink, requiring much time and labor, sorely trying both the fingers and the patience of the operator, as well as soiling his clothes, and oftentimes proving injurious to the calf or other young animal, which instinctively struggles against the violation of the laws by which nature fitted it for receiving its food.

By my invention all these difficulties may be avoided. The use of the cow may be had for making butter and cheese, the calf raised, the time and trouble spent in teaching it to drink saved, the soiling of clothes prevented, and the process of feeding the animal rendered natural, safe, easy, and pleasant.

Having thus described my invention, its construction and operation, what I claim as new, and desire to secure by Letters Patent, is—

1. An artificial teat, constructed substantially as described, for feeding calves and similar young animals.

2. Providing the same with means whereby it can be readily attached to or detached from the vessel containing the food.

3. Securing the artificial teat to a float, substantially as and for the purpose set forth.

WILLIAM C. DODGE.

Witnesses:
ANDREW WHITELEY,
E. R. McKEAN.